Aug. 9, 1955

P. L. MILLER 2,714,903

PORTABLE POWER SAW GUIDE AND SUPPORTING MEANS

Filed Feb. 17, 1954

INVENTOR.
*Pryor L. Miller.*
BY
*Gustav Miller*
ATTORNEY

Aug. 9, 1955 P. L. MILLER 2,714,903
PORTABLE POWER SAW GUIDE AND SUPPORTING MEANS
Filed Feb. 17, 1954 3 Sheets-Sheet 2

INVENTOR.
Pryor L. Miller.
BY
Gustave Miller
ATTORNEY

Aug. 9, 1955  P. L. MILLER  2,714,903
PORTABLE POWER SAW GUIDE AND SUPPORTING MEANS
Filed Feb. 17, 1954  3 Sheets-Sheet 3

INVENTOR.
Pryor L. Miller.
BY
Gustan Miller
ATTORNEY

United States Patent Office 2,714,903
Patented Aug. 9, 1955

2,714,903

PORTABLE POWER SAW GUIDE AND SUPPORTING MEANS

Pryor Lamar Miller, Jacksonville, Fla.

Application February 17, 1954, Serial No. 410,799

1 Claim. (Cl. 143—6)

This invention relates to a portable power saw guide and supporting means.

An object of this invention is to provide a simple and sturdy guide and support means for a portable power saw which may be easily attached to a work table.

It is another object of this invention to provide a guide and support for a portable power saw which may be readily adjusted to different angular positions in a horizontal plane to permit cutting the workpiece at different angles.

Other objects and advantages of the invention will become apparent from the following description, taken in connection with the accompanying drawings in which.

Figure 1:
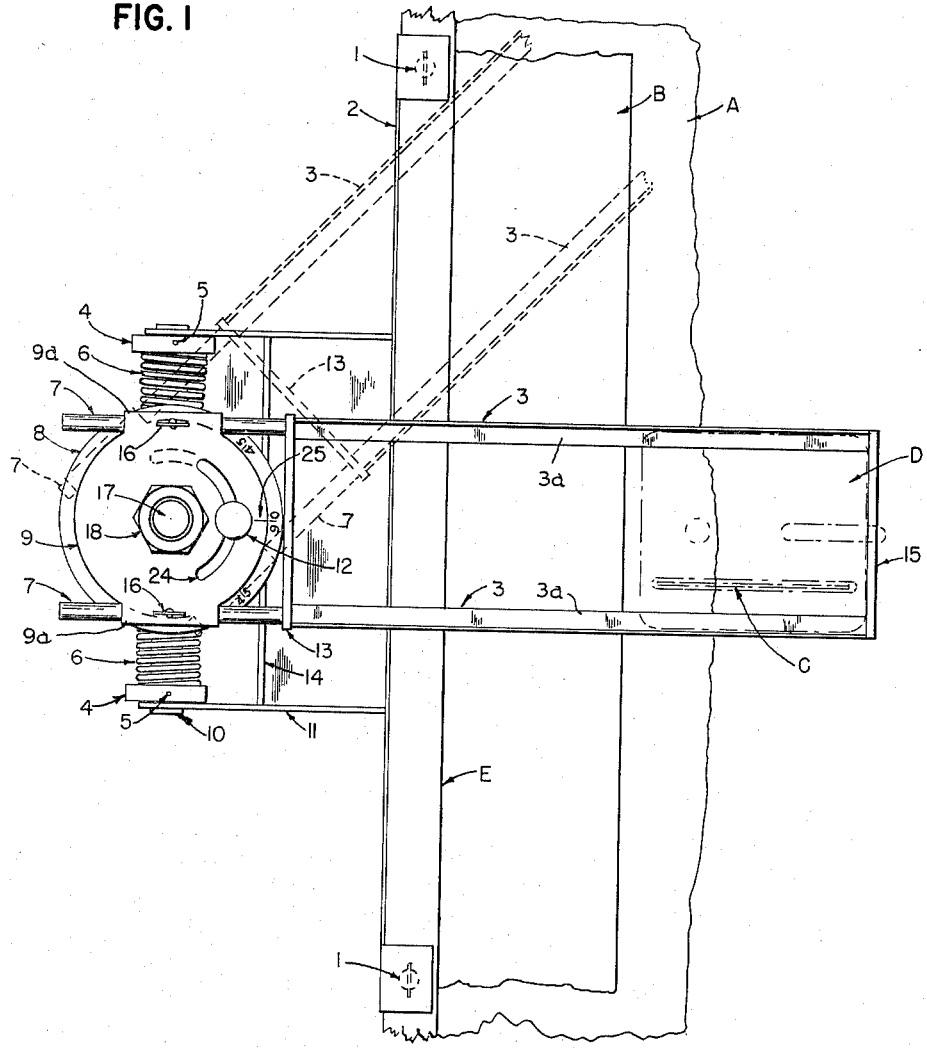
Fig. 1 is a plan view of a portable power saw guide and support in accordance with the invention.

Referring now to the drawings, the portable power saw guide and support comprises an elongated bracket member 2 having end portions 2a of U-shape in cross section which receive the clamp members 1. The bracket 2 is clamped by means of screw clamps 1 to backing blocks E which, in turn, are rigidly secured to the work table A. A pair of spaced support bracket members 11 are rigidly attached to and project perpendicularly from the outer surface of the bracket member 2. A base plate 23 extends between the brackets 11. Plate 23 may be made integral with brackets 11, or, alternatively, brackets 11 and plate 23 may be formed from a single plate member which is bent to suitable shape. As will be explained later, brackets 11 serve as a support for shaft 10, the horizontal axis about which the saw guide and support is movable.

The support and guide 3 for the portable power saw D comprises a pair of laterally spaced angle members 3a which are connected together by cross bars 13 and 15. The inwardly disposed surfaces of the angle members 3a serve as tracks along which the portable power saw D may be moved when cutting the workpiece B. The inner cross bar 13 in addition to connecting together the spaced angle members 3a also serves as an end stop for the portable power saw. Likewise, the cross bar 15 in addition to connecting together the spaced angle members 3a also serves as an outer stop member to limit the movement of the portable power saw.

A pair of spaced bars 7 are welded or otherwise rigidly attached to the surface of the inner cross bar 13 on the opposite side of bar 13 to that on which the angle members 3a are attached. Each of the respective bars 7 is substantially in alignment with one of the angle members 3a. The bars 7 are adjustably secured to a rotatable index head 9 which is provided at diametrically opposite sides with tubular sleeves 9a through which the bar members 7 pass. In order to adjustably secure the bars 7 in a given adjusted position with respect to the index head 9, clamp screws 16 are provided, the screws 16 passing through the upper surface of head 9 and engaging the bars 7 to maintain them in a fixed adjusted position with respect to head 9.

Figure 6:
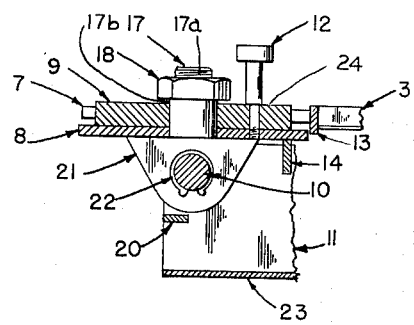
Fig. 6 is a view in section along line 6—6 of Fig. 3.

A generally circular base plate 8 lies beneath the index head 9. A pin member 17 projects upwardly from the base plate 8 and passes through a suitable aperture in the index head 9. The pin 17 is provided with a thread 17a, Figure 6, at its upper end to receive a nut 18. Below its threaded portion, the pin 17 is provided with a shoulder 17b which serves as a bearing for the underneath surface of the nut 18 and prevents nut 18 from frictionally engaging the upper surface of the index head 9.

The base plate 8 may be calibrated in angular degrees to indicate the relative angular movement of the index head relative to the base plate. For this purpose, the index head 9 may be provided with an index mark 25, Figure 1. This permits the index head 9 to be freely rotatable with respect to the base plate 8 about the pin 17 to permit angular adjustment of the saw guide and support. Thus, the guide and support 3 may be angularly adjusted to the dotted outline position shown in Fig. 1. As will best be seen in Fig. 1, the index head 9 is provided with an arcuate slot 24 and a clamp pin member 12 is provided with a reduced portion, Figure 6, which passes downwardly through the slot 24 and into a threaded bore in base plate 8. Due to the provision of slot 24, the index head 9 may be rotated to any desired angular position within the limits of the slot 24, and when the index head 9 has reached a desired position of adjustment, the clamp pin member 12 may then be tightened in such manner as to hold the index head in a given position with respect to base plate 8. Since the saw support and guide 3 is rigidly attached to the index head 9 by means of the rods 7, any movement imparted to the index head 9 is also imparted to the guide member 3.

A pair of spaced-apart lug members 21 are rigidly attached as by welding to the underneath surface of the base plate 8. The lug members 21 are apertured to receive the shaft 10. The opposite ends of shaft 10 are supported by the support brackets 11. In order to prevent any axial movement of the lugs 21 along the shaft 10, snap rings 22 are provided adjacent the inner facing surfaces of lugs 21. The rings 22 are received in shallow grooves in the shaft 10 to hold the lugs 21, and hence, the base plate 8, from axial displacement along shaft 10. The shaft 10 fits loosely with respect to the lugs 21, but is a tight fit, or is otherwise securely fastened to the lugs 11 to prevent endwise motion of the shaft 10.

Figure 4:
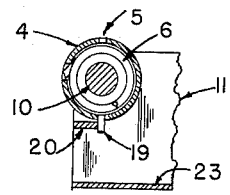
Fig. 4 is a view in section along line 4—4 of Fig. 3.
Figure 5:
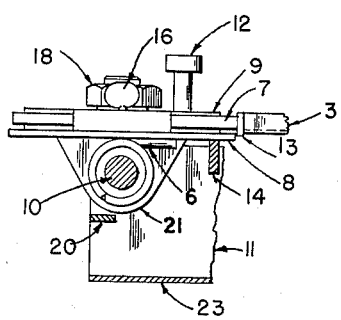
Fig. 5 is a view in section along line 5—5 of Fig. 3.

The saw support and guide 3 is biased to an upward position by springs 6 which are positioned on shaft 10 on opposite sides of the lugs 21. The upward force of the springs is counterbalanced by the force of gravity on the saw support and guide, and also by the weight of the saw D. One end of each of the springs 6 is attached to one of the respective lugs 21. The opposite or outer end of each of the springs 6 is received in and fixed with respect to one of the spring adjusting rings 4. Each of the rings 4 is loosely mounted on shaft 10 and is provided with a plurality of radial apertures 5 to receive a pin 19, Figure 4. The pin 19 is selectively positioned in one of the radial apertures 5 in such manner as to project radially outwardly of the circumference of the ring 4. The spring tension causes the member 4 to rotate until the pin 19 abuts against the stop member 20. The tension on each of the respective springs 6 can be adjusted to a desired value by properly positioning the pin 19.

Figure 2:
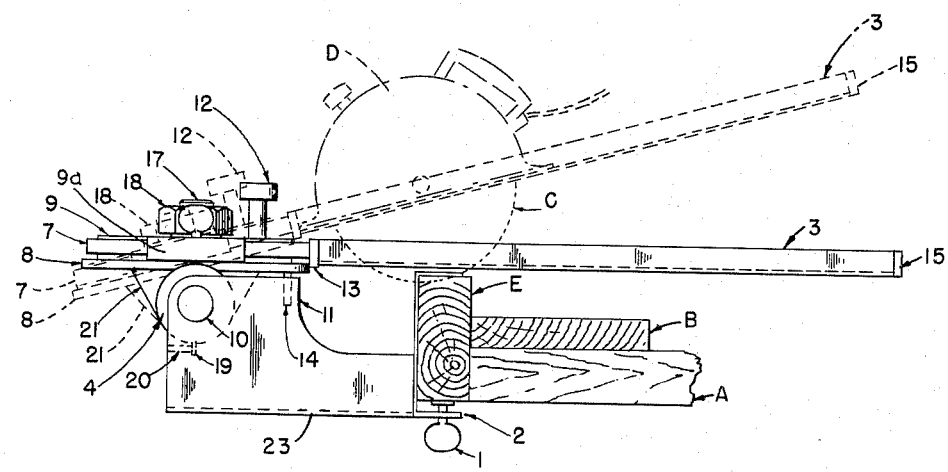
Fig. 2 is a side elevation of the apparatus of Fig. 1.
Figure 3:
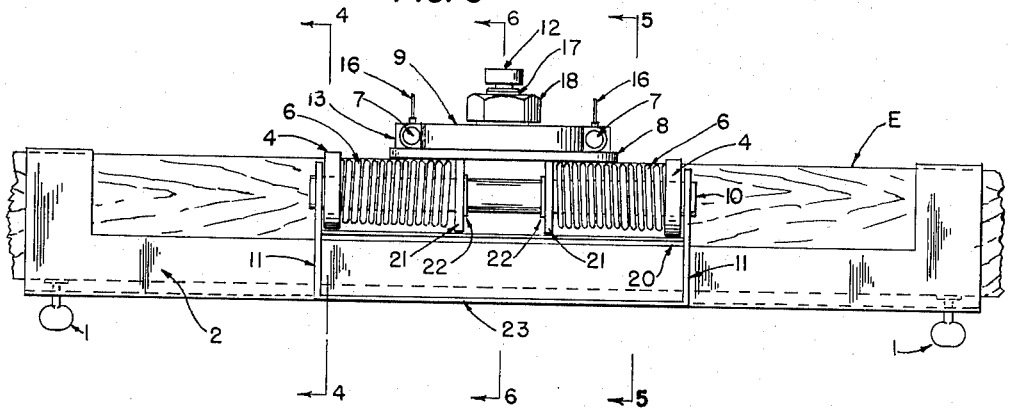
Fig. 3 is a rear elevation of the apparatus of Fig. 1.

The saw guide and support 3 may be moved upwardly about the axis of shaft 10, as shown in dotted outline in Fig. 2, the lugs 21 pivoting about shaft 10. This permits the support 3 to be moved clear of the work when desired. The degree of forward movement of the saw support 3 about shaft 10 is limited by the cross bar 14 which is disposed beneath the work plate 8. The degree of backward movement of saw support 3 about shaft 10 is limited by cross bar 20 which engages lugs 21 upon a predetermined backward movement of support 3.

It can be seen from the foregoing that there is provided in accordance with the invention a simple and easily operable guide and support for a portable power saw. The guide and support provides tracks along which the saw may be moved while the saw is operating on the workpiece. Further, the guide and support is easily adjusted to permit angular cuts by the power saw on the workpiece.

While there has been shown and described a particular embodiment of the invention, it will be obvious to those skilled in the art that various changes and modifications may be made therein, and it is aimed to cover all such changes and modifications as wall within the spirit and scope of the invention.

What is claimed is:

A guide and support for a portable power saw comprising a pair of laterally spaced track members along which said saw may be longitudinally shifted, an index head, said tracks being connected at one end to said index head, a base plate disposed beneath said index head, said base plate and said index head normally extending in a horizontal plane, means carried by said base plate for pivotally supporting said index head for angular adjustment in a horizontal plane, said index head having an arcuate slot, pin means passing through said slot and into engagement with said base plate for selectively holding said index head in a given adjusted position with respect to said base plate, an elongated support bracket, means for clamping said support bracket to a work table, a pair of spaced support brackets extending substantially perpendicularly from said elongated bracket, a shaft extending between said spaced brackets, means carried by said base plate for supporting said base plate on said shaft, said base plate being angularly movable in a vertical plane about the axis of said shaft, coil torsion spring means carried by said shaft for normally biasing said support upwardly about the axis of said shaft and means carried by said shaft for adjusting the tension of said coil spring means.

References Cited in the file of this patent
UNITED STATES PATENTS

| | | |
|---|---|---|
| 1,874,175 | Earhart | Aug. 30, 1932 |
| 2,502,640 | Coleman | Apr. 4, 1950 |
| 2,556,137 | Emmons | June 5, 1951 |
| 2,558,217 | Hess et al. | June 26, 1951 |
| 2,596,524 | Bridwell | May 13, 1952 |
| 2,627,287 | McCluskey | Feb. 3, 1953 |
| 2,651,333 | Spinney | Sept. 8, 1953 |